United States Patent [19]
Tanuma

[11] Patent Number: 5,581,573
[45] Date of Patent: Dec. 3, 1996

[54] SOLID-STATE LASER DEVICE WITH DIFFUSED-LIGHT EXCITATION, AND INTEGRATING SPHERE

[75] Inventor: Ryohei Tanuma, Kawasaki, Japan

[73] Assignee: Fuji Electric Co., Ltd., Tokyo, Japan

[21] Appl. No.: 421,118

[22] Filed: Apr. 13, 1995

Related U.S. Application Data

[63] Continuation-in-part of Ser. No. 228,223, Apr. 15, 1994, Pat. No. 5,490,161.

[30] Foreign Application Priority Data

Apr. 14, 1994 [JP] Japan ..................... 6-075214

[51] Int. Cl.$^6$ ..................................... H01S 3/093
[52] U.S. Cl. ............................................... 372/72
[58] Field of Search ..................... 372/70, 69, 72

[56] References Cited

U.S. PATENT DOCUMENTS 5,263,042  11/1993  Kojima et al. ..................... 372/72

Primary Examiner—James W. Davie
Attorney, Agent, or Firm—Brumbaugh, Graves, Donohue & Raymond

[57] ABSTRACT

In a laser device having a solid-state laser medium of a slab or rod-shaped crystal, a flash lamp serving as an excitation-light source for the laser medium, and a reflector made of a foamed quartz glass for injecting light produced by the light source into the laser medium, an insulator made from a foamed glass is utilized to improve the efficiency of light injection and the resulting beam quality. In addition, where the laser medium is doped with $Nd^{3+}$, a wavelength conversion filter made of a material doped with $Cr^{3+}$ or $Ti^{3+}$ is utilized to convert most of the excitation light into a wavelength most suitable for exciting the laser medium. Foamed quartz glass is preferred also as the material for the inner surface of an integrating sphere for optical measurement.

8 Claims, 4 Drawing Sheets

SOLID-STATE LASER DEVICE WITH DIFFUSED-LIGHT EXCITATION, AND INTEGRATING SPHERE

This application is a continuation-in-part application of application Ser. No. 08/228,223 filed on Apr. 15, 1994, U.S. Pat. No. 5,490,161.

BACKGROUND OF THE INVENTION

The present invention relates to solid-state laser devices and to integrating spheres, and more particularly to reflectors and heat insulators for solid-state laser devices, an arrangement for providing optimized excitation light to the solid-state laser medium, and integrating spheres for use in optical measuring systems.

On account of their compactness and ease of use, solid-state lasers as typified by the YAG laser have been used extensively, especially in the laser machining field. Recently, solid-state lasers have also found wide application in the measurement and medical fields.

Challenges facing the designers of solid-state lasers are raising the oscillation efficiency of the lasers and eliminating undesirable effect caused by heat build-up in the laser medium. In order to solve these problems, the following requirements must be satisfied: (a) the light emitted by the excitation light source must be efficiently introduced in the laser medium, and (b) the excitation light must have wavelength distribution suitable for laser oscillation.

In a typical solid-state laser device, a laser medium is in the shape of a rod or a slab (plate), and an electric discharge tube, e.g., a krypton flash lamp disposed parallel to the laser medium, is used for exciting the laser medium to emit light for oscillation. For laser efficiency, the manner in which excitation light is injected into the laser medium is important. For light injection, reflectors made from various highly reflective materials have been used. Most common among these are gold-plated copper or brass reflectors. Also known are silver-plated reflectors and ceramic reflectors.

A similar need for high reflectance arises with so-called integrating spheres as used in optical measurement systems. If a conventional optical detector is used to measure light energy, for example, the measured value may depend on the size of a light-receiving surface and on the intensity distribution of incident light across the light-receiving surface. Thus, different beams with the same energy may produce different measurement readings. For more consistent readings, an integrating sphere in which injected light is repeatedly and diffusely reflected at its inner surface may be utilized so that the intensity distribution of the light is made uniform. For high reflectance of the inner surface of the integrating sphere, white coatings having MgO or $BaSO_4$ as their main component are typically used.

Gold-plated reflectors as mentioned above have desirably high reflectance, especially for light of wavelength near 0.8 µm, which contributes greatly to the oscillation of YAG lasers, with little decrease in reflectance of the plated surface due to contamination and deterioration. However, since there is considerable absorption loss for light in the 0.5 to 0.6 µm absorption band of Nd:YAG crystals, and the reflectance of gold-plated surfaces falls off at wavelengths below 0.6 µm, excitation efficiency of gold-plated reflectors remains limited. Furthermore, because of large absorption in the 0.5 to 0.6 µm wavelength band, gold-plated reflectors are not suitable for solid-state laser devices having laser crystals doped with $Cr^{3+}$, such as Cr:Nd:GSGG and $Cr:BeAl_2O_2$ (alexandrite), as the laser medium.

As reflectors for short-wavelength light, silver-plated reflectors are problematic because silver forms sulfides having decreased reflectance. This difficulty can be overcome, e.g., by coating the silver surface with a protective film of $SiO_2$ for example, or by silver-plating the back surface of a glass plate so that the silver surface does not come into direct contact with cooling water. In high-power lasers, however, silver-plate surfaces are less suitable because of the likelihood of damage caused by heat produced by the excitation light.

Ceramic materials have also received recent attention as reflector materials for short-wavelength light, but the reflectance of such materials may not always be sufficient. Reflectance may be lower still with reflectors in which so-called free-cutting ceramics are used, which are made by dispersing ceramic particles in a glass matrix.

The above-mentioned problems relating to reflectors for laser devices similarly apply to integrating spheres. Although, for weak light, the above-mentioned coatings containing MgO, $BaSO_4$ or the like are well suited for integrating spheres, at higher powers these coatings' resistance to light becomes unsatisfactory.

In order to achieve improved oscillation with a slab-shaped crystal laser medium, not only the reflector but also the heat insulators for the crystal must be made of a material which does not absorb light. In order to form a one-dimensional thermal gradient, the laser medium of a slab laser has a structure in which a pair of side surfaces of the slab are cooled, between which side surface the laser light propagates along a zigzag path due to repeated total reflection, and the remaining two side surfaces are provided with heat insulators to inhibit heat flow toward them. Since these heat insulators are positioned in the vicinity of the laser medium, their light absorption may cause not only reduction in the efficiency of the laser but also heating of the laser medium due to heat build-up in the heat insulators. Therefore, heat insulators used in a slab laser must have high reflectance or transmittance to the laser light and the excitation light, in addition to having low thermal conductivity. In the past, glass, ceramics and the like have been used for such heat insulators.

Another method of improving oscillation efficiency is to convert the wavelength distribution of the excitation light to the distribution suitable for the excitation of the laser medium. This is based on the fact that only a small range of the spectrum of light emitted by the flash lamp is suitable for laser oscillation, which is a major reason for the low efficiency of a lamp-excited solid state laser.

In the above wavelength-conversion approach, the wavelength of the excitation light is converted by using a substance that emits fluorescent light having a wavelength suitable for the laser oscillation. One well-known method, as disclosed in Japanese unexamined patent publication (Kokai) No. S61-23374, is to use a piece of glass doped with samarium (Sm) or a piece of glass doped with cerium (Ce) as a filter for excitation light in a solid state laser utilizing a laser medium doped with $Nd^{3+}$ as an activator. The filter absorbs light in the ultraviolet region and emits fluorescent light having a wavelength λ of about 0.6 µm. Since $Nd^{3+}$ has one of its absorption peaks in this wavelength region, the fluorescent light is efficiently absorbed to improve oscillation efficiency.

A similar method is disclosed in Japanese unexamined patent publication (Kokai) No. H2-123776, which discloses an invention of the present inventor, in which an AlGaAs semiconductor is used to convert the wavelength of the excitation light. Since the band gap of an AlGaAs semiconductor corresponds to photoenergy of around wavelength $\lambda=810$ nm, absorbed excitation light with a wavelength shorter than 810 nm excites carriers above the conduction band with subsequent recombination that results in emission of light of wavelength $\lambda$ around $\lambda=810$ nm as a fluorescent light. Since light with 810 nm wavelength is most suitable for exciting $Nd^{3+}$, highly efficient laser oscillation is achieved for laser medium doped with $Nd^{3+}$.

In both the method utilizing glass filters doped with Sm or Ce and the method utilizing AlGaAs semiconductor filters, a part of unutilized energy is converted to thermal energy in such filters, which reduces the thermal load to the laser crystal. Therefore, the above-described filters are effective means for solving the problems attributable to the heat developed in a solid state laser crystal. However, it has been known that the method of providing an excitation light filter with glass being doped with Sm or Ce gives low fluorescent emission efficiency which only slightly improves the efficiency of a solid state laser. Converting the wavelength of excitation light with an AlGaAs semiconductor is a promising method, but it still has a problem in that the refractive index of AlGaAs is as high as 3 or more. If the refractive index is high, most of the excitation light is reflected to be only a small amount of incident light. In addition, the light which has been wavelength-converted therein is not easily emitted to the outside. Further, this material has a practical difficulty of being susceptible to oxidation.

In general, the absorption spectrum of $Nd^{3+}$ doped in a solid state laser medium exhibits a localized distribution similar to a line spectrum, which poorly matches the spectral distribution of light from a lamp. This is a major cause of low efficiency of a Nd:YAG laser. With respect to improvement of the efficiency of a solid state laser utilizing $Nd^{3+}$ as an activator, Koechner describes (W. Koechner, *Solid State Laser Engineering*, page 57, (3rd ed., Spinger-Verlag Corp., 1992)) a method utilizing a laser medium doped with multiple elements such as $Gd_3Sc_2Ga_3O_{12}$ doped with Nd and Cr (Nd, Cr:GSGG). Unlike $Nd^{3+}$, $Cr^{3+}$ exhibits a absorption spectrum widely ranging from 400 to 650 nm. As a result, when a combination of Nd and Cr:GSGG is used, $Nd^{3+}$ is excited by the so-called sensitization, wherein $Cr^{3+}$ absorbs excitation light with wavelengths in a wide range and transfers its energy from the excited state of $Cr^{3+}$ to that of $Nd^{3+}$. This results in an improvement in efficiency compared with the case where only $Nd^{3+}$ is used, because excitation light with a wider range of wavelengths is effectively used. In essence, this method changes the absorption spectrum of the laser medium instead of converting the wavelength of the excitation light.

A method based on a somewhat different idea is disclosed in Japanese examined patent publication (Kokoku) No. H5-66035, which discloses a solid state laser rod doped with multiple elements, such as Nd and Cr:GSGG, and a Nd:YAG rod arranged in series. The two laser rods are simultaneously excited by introducing excitation light from the side of the multi-element solid state laser rod. The multi-element solid state laser medium absorbs light with a wide range of wavelengths for oscillation, and light which has passed through the multi-element medium excites the Nd:YAG for oscillation. Since the light which has passed through the multi-element solid state laser has wavelength distribution suitable for the excitation of the Nd:YAG, highly efficient laser oscillation can be achieved as a whole.

Although the method utilizing a solid state laser medium doped with multiple elements such as Nd and Cr:GSGG provides an effective means for improving efficiency, reduction in the thermal load to the laser medium can not be expected because excessive thermal energy is produced in the crystal. GSGG or the like has a problem in that it is more susceptible to heat because its thermal conductivity is smaller than that of YAG.

In the method wherein a multi-element solid state laser rod doped with elements such as Nd and Cr:GSGG is placed in series with an Nd:YAG rod and are simultaneously excited by introducing excitation light from the side of the multi-element solid state laser rod, a problem arises in that laser light is oscillated with two different wavelengths. Although the oscillation of two wavelengths is acceptable in some applications, it results in many difficulties including the fact that the wide range of wavelengths increases the effect of chromatic aberration of the lens. This method is also much susceptible to heat, similar to the case in which Nd or Cr:GSGG is used alone.

In the context of heat insulators, glass, which has been used in slab lasers, absorbs neither excitation light nor laser light. However, glass poses problems in machining and in being insufficiently strong. Ceramics are relatively well suited as a heat insulator, but they have a problem of being heated by absorbing light in the region of short wavelengths. Further, both glass and ceramics lack sufficiently low thermal conductivity as a heat insulator.

SUMMARY OF THE INVENTION

In a preferred embodiment of the present invention, a solid-state laser device has an optical resonator for a solid-state laser medium, a light source for exciting the solid-state laser medium, and a reflector for injecting light from the light source into the solid-state laser medium, with foamed glass as reflector material.

In another preferred embodiment of the present invention, a solid-state laser device has an optical resonator for a solid-state laser medium, a light source for exciting the solid-state laser medium, and a diffusion (or "diffuse") reflector for injecting light produced by the light source into the solid-state laser medium, with a highly reflective material adhered to the back surface of the reflector. The diffusion reflector may be made of foamed glass.

In yet another preferred embodiment of the present invention, an integrating sphere in which a surface delimiting a spatial region having at least one light input/output opening is made of a diffusely reflective material. The diffusely reflective material is foamed glass. The integrating sphere is designed to make the intensity distribution of light introduced through the input/output opening uniform.

In yet another preferred embodiment of the present invention, a solid state laser device includes a slab-shaped solid state laser medium with a pair of opposing optically polished side surfaces, a total reflection mirror and an output mirror arranged at opposite end faces of the laser medium, and heat insulators made of foamed glass in contact with the sides of the laser medium other than the optically polished surfaces.

In yet another preferred embodiment of the present invention, a solid-state laser device includes an optical resonator for a solid-state laser medium doped with trivalent neodymium ions, a light source for exciting the solid state laser medium, and a reflector having a reflecting surface facing the light source and solid state laser medium. In addition, a wavelength-conversion filter made of a crystal doped with $Cr^{3+}$ is interposed between the light source and the solid state laser medium. In this case, the crystal is preferably one of $Y_3Al_5O_{12}$, $Y_3Ga_5O_{15}$, $Y_3Sc_2Ga_3O_{12}$, $Gd_3Ga_5O_{12}$, $Gd_3Sc_2Ga_3O_{12}$, $La_3Lu_2Ga_3O_{12}$, $KYnF_3$, $BeAl_2O_4$, $LiSrAlF_6$, and $LiCaAlF_6$.

In yet another preferred embodiment of the present invention, a solid-state laser device includes an optical resonator for a solid-state laser medium doped with trivalent neodymium ions, a light source for exciting the solid state laser medium, and a reflector having a reflecting surface facing the light source and solid state laser medium. In addition, a wavelength-conversion filter made of a glass doped with $Cr^{3+}$ or $Al_2O_3$ doped with $Ti^{3+}$ is provided between the light source and the solid state laser medium. The wavelength conversion filters made of a material doped with trivalent ions of Cr or Ti convert most of the excitation light to a wavelength most suitable for exciting a laser medium doped with $Nd^{3+}$. This allows laser oscillation at extremely high efficiency.

It is an object of the invention to provide reflectors for a high-efficiency solid-state laser which have high reflectance over a wide range of wavelengths extending from the infrared region to the ultraviolet region.

It is another object of the present invention to provide heat insulators for slab lasers which facilitate high light-injection efficiency and high laser-beam quality without absorbing light over the range from the near infrared region up to the ultraviolet region.

It is yet another object of the present invention to provide a system for obtaining excitation light for solid-state lasers which has optimized wavelength for exciting the laser medium.

It is still another object of the present invention to provide an integrating sphere having an inner surface of high diffusion reflectance which can withstand strong light such as a high-power laser light.

DETAILED DESCRIPTION OF PREFERRED EMBODIMENTS

Figure 1A:
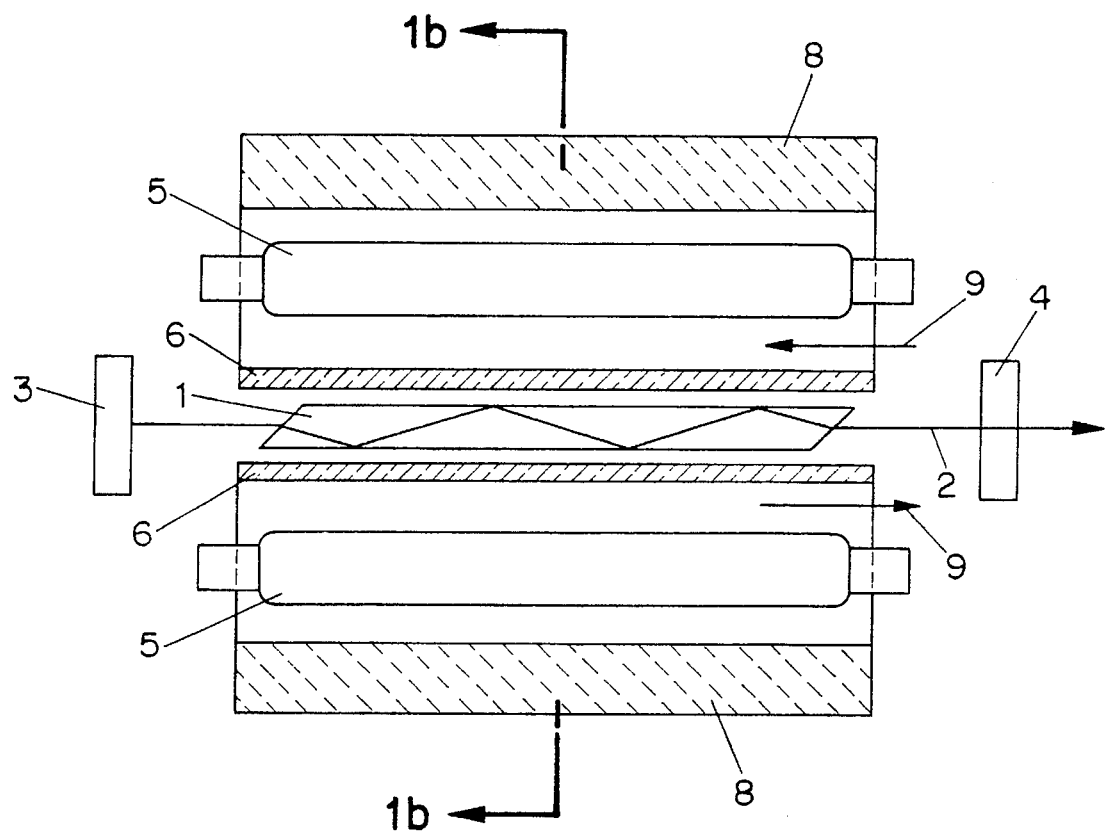
FIG. 1(a) is a longitudinal cross section of a preferred embodiment of a YAG slab laser device according to the present invention.
Figure 1B:
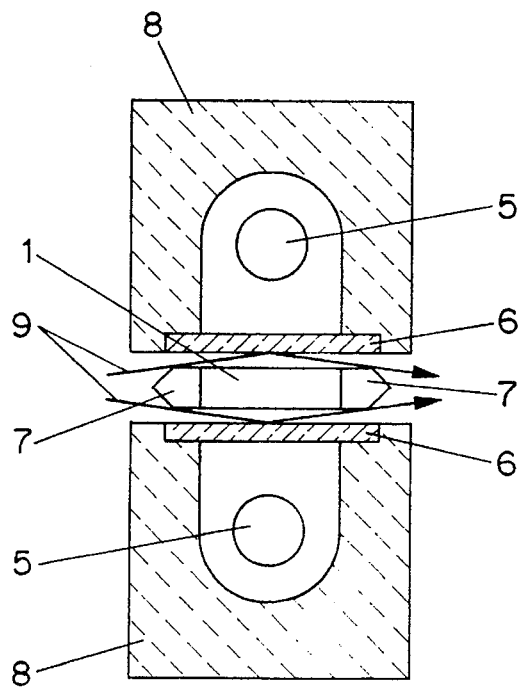
FIG. 1(b) is a lateral cross section of the YAG slab laser device shown in FIG. 1(a) taken along line 1b—1b.

As shown in FIGS. 1(a) and 1(b), a laser light 2 propagates through a YAG slab crystal 1 in a zigzag fashion in a first preferred embodiment of the present invention. Shown further are totally reflective mirror 3, an output mirror 4, excitation flash lamps 5, a Pyrex (or borosilicate) glass filter 6 for filtering out ultraviolet rays, an insulating material 7 on the sides of the YAG slab crystal 1, a reflector 8 made from foamed quartz glass, and flows 9 of cooling water. The slab-shaped YAG crystal 1 is disposed between the totally reflective mirror 3 and the output mirror 4, and the two flash lamps 5 are disposed opposite to the upper and lower surfaces of the crystal slab 1. The borosilicate glass filters 6 are interposed between the flash lamps 5 and the YAG crystal slab 1, and the reflectors 8 encircle the flash lamps 5. The insulating material 7, which is a foamed quartz glass, contacts the sides of the crystal slab 1 and extend along the length of the crystal slab 1. Since foamed glass, which has numerous internal bubbles, has small thermal conductivity, high reflectance and highly malleable, foamed glass is ideally suited to serve as a heat insulator for a slab laser medium. To cool the flash lamps 5, water flows 9 may be channeled through cavities defined by the filters 6 and the reflectors 8.

While some of the light produced by the excitation flash lamp 5 passes through the Pyrex (borosilicate) glass filter 6 and enters the YAG slab crystal 1 directly, most of the light follows a more complicated path. Light follows various different paths: some portions of light enter the YAG slab crystal 1 after being irregularly reflected by the foamed quartz glass reflector 8, for example, some portions are absorbed by the cooling water, some escape through the cooling water entrances/exits, some escape through the back surface of the foamed quartz glass reflector 8, and still other portions enter the YAG slab crystal 1 but exit through the opposite side without being absorbed by the crystal.

With a conventional gold-plated reflector, the fraction of light absorbed by the reflector may be as much as approximately 50%. A large amount of excitation light is absorbed by the reflector because, as described above, there are many opportunities for light to be repeatedly reflected by the reflector, and because the reflectance of gold-plated reflectors drops off at wavelengths less than 0.6 μm. In contrast, in the preferred embodiment of the invention shown in Figs. 1(a) and 1(b), because absorption in the foamed quartz reflector 8 is low, the portion of light which is absorbed by the YAG slab crystal 1 is increased, and high-efficiency laser oscillation is achieved.

In the embodiment shown in FIGS. 1(a) and 1(b), most of the light produced by the excitation light source does not directly enter the laser medium, but enters the foamed quartz reflector and is irregularly reflected by the minute air bubbles. Of the light that enters the reflector, most is reflected several times and then emitted outside the reflector. Some light is irregularly reflected many times, but, because the transmittance of quartz is essentially 100%, sooner or later this light is emitted to the outside also.

To prevent undue loss of light through the back surface of the reflector, this quartz reflector must have sufficient thickness. Quartz is particularly suited as material for the foamed glass. However, if some light absorption at short wavelengths is tolerable, other glass materials such as Pyrex can be used instead. Because loss of excitation light in the reflector is almost eliminated in the first embodiment, high-efficiency laser oscillation becomes possible.

Figure 2:
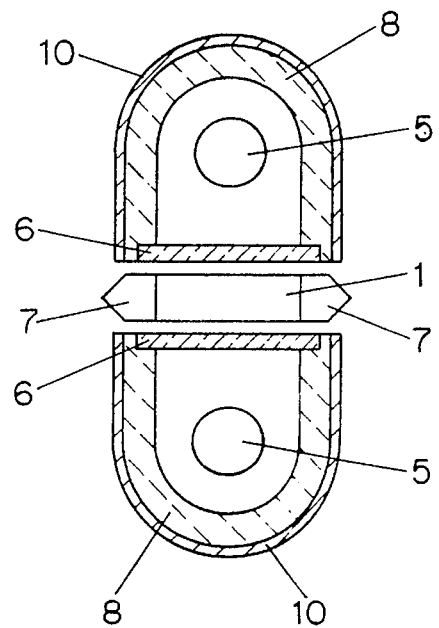
FIG. 2 is a lateral cross section of an another preferred embodiment of a YAG slab laser device according to the present invention.

In the embodiment illustrated by FIG. 2, the back surface of a reflector 8 made of foamed quartz has a silver-plated surface 10. Some of the light entering the reflector 8 reaches the back surface of the foamed quartz reflector 8, but, because this light is reflected by the silver-plate surface 10, light does not escape through the back surface. Thus, the reflectance of the reflector 8 is increased, and high-efficiency laser excitation is achieved. Since it is possible to make the foamed quartz of the reflector 8 thin, the size of the laser device can be reduced. As shown in FIG. 2, the reflectors 8 are thinner than those shown in FIGS. 1(*a*) and 1(*b*).

In the embodiment shown in FIG. 2, unlike the foamed quartz reflector of the embodiment shown in FIGS. 1(*a*) and 1(*b*) which requires sufficient thickness to prevent light from escaping through to the back surface, the reflectance is raised to prevent light from passing through the back surface. Accordingly, high reflectance can be realized in a compact reflector for high-efficiency laser oscillation.

For the diffusion reflector, foamed quartz or a free-cutting ceramic material may be used. Also, besides silver as the highly reflective material, other materials can be used including powders of MgO or $BaSO_4$ white coatings used for the inner surface coatings of integrating spheres, and highly reflective resins developed as reflector materials for use in lasers.

As mentioned above, when a highly reflective material other than gold is used as a reflector material for a solid-state laser, there have been a severe difficulties due to inadequate resistance to strong excitation light. With respect to this point, in the second embodiment of FIG. 2, most of the excitation light is reflected by the diffusion reflector, and the amount of light which reaches the highly reflective material on the rear surface of the reflector is extremely small. Thus, because the highly reflective material is used only to reflect weak light which has passed through the diffusion reflector, a reflective material with lesser light resistance can be used. Also, because these highly reflective materials are adhered to the back surface of the diffusion reflector, without the reflecting surface making contact with cooling water or the like, materials such as silver can be used where surface deterioration would otherwise pose problems.

Figure 3:
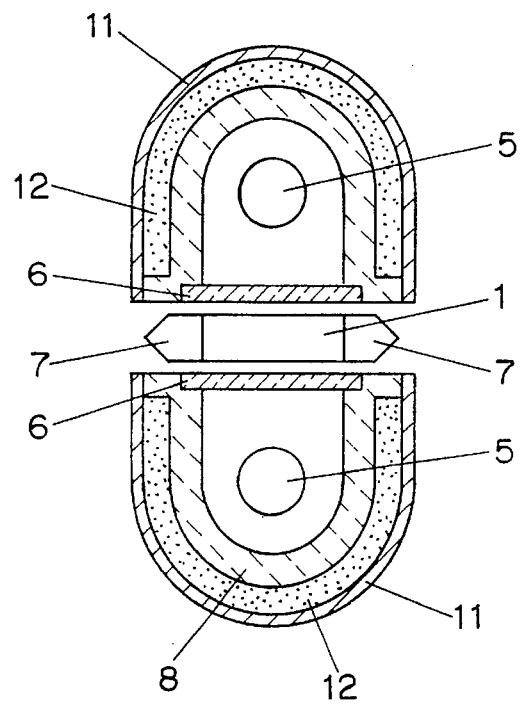
FIG. 3 is a lateral cross section of yet another preferred embodiment of a YAG slab laser device according to the present invention.

As shown in FIG. 3, another preferred embodiment of the present invention includes magnesium oxide (MgO) powder 12 packed between a foamed quartz reflector 8 and a protective cover 11 which covers the external periphery of the reflector 8. Because the reflectance of the MgO powder 12 is high, light is prevented from escaping through the back surface of the reflector 8 as for the silver plated surface 10 in FIG. 2.

It should be apparent that the embodiments shown in FIGS. 2 and 3 incorporate reflectors 8 in arrangements which achieve higher reflectance than the embodiment shown in FIGS. 1(*a*) and 1(*b*). Accordingly, the embodiments shown in FIGS. 2 and 3 achieve more efficient laser oscillation. Furthermore, in the embodiments shown in FIGS. 2 and 3, the foamed quartz reflector 8 can be made thinner than that in the embodiment shown in FIG. 1(*a*), thereby achieving increased compactness of the laser device.

Figure 4:
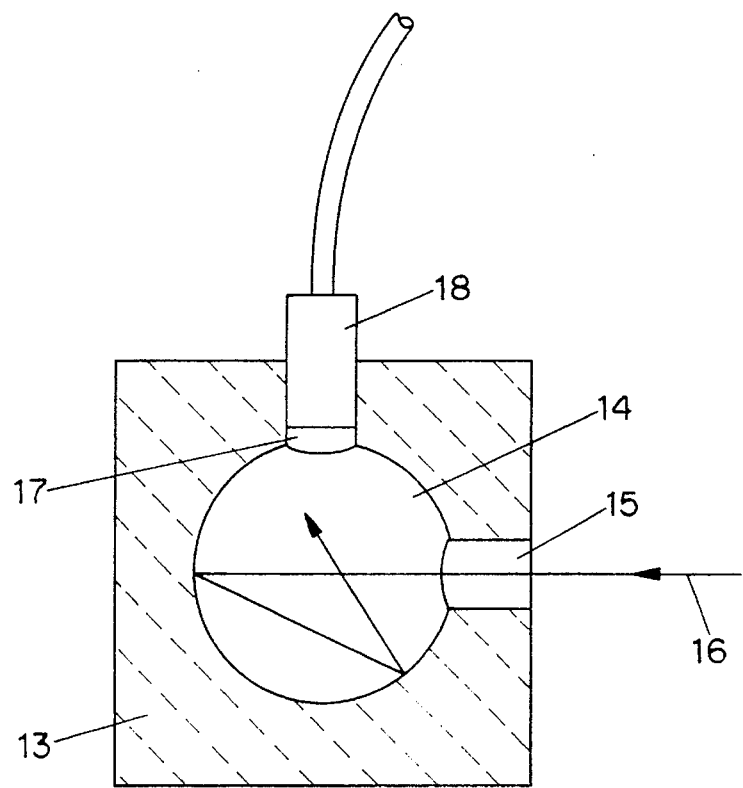
FIG. 4 is a lateral cross section of a preferred embodiment of an integrating sphere for light measurement according to the present invention.

Shown in FIG. 4 is an integrating sphere 13 with an interior spatial region 14, an incident opening 15 for laser light 16 to be measured, an emergent opening 17, and a light detector element 18 disposed in the emergent opening 17. The body of the integrating sphere 13 is made of foamed quartz. Laser light 16 enters the spherical space 14 in the integrating sphere 13 through the incident opening 15 and reaches the emergent opening 17 after being repeatedly and irregularly reflected by the inner surface of the spherical space 14. The intensity of the light in the emergent opening 17 is then detected by the detector element 18.

In the integrating sphere shown in FIG. 4, the foamed quartz glass, because of its high light-reflectance, repeatedly and irregularly reflects the laser light 16 entering the integrating sphere, thus making the intensity distribution of the light uniform. Since the intensity distribution of the laser light entering the sphere does not affect measurement, high-precision measurements are possible. Furthermore, because the resistance of the foamed quartz to laser light is high, this integrating sphere can be used safely with high-power lasers.

Figure 5A:
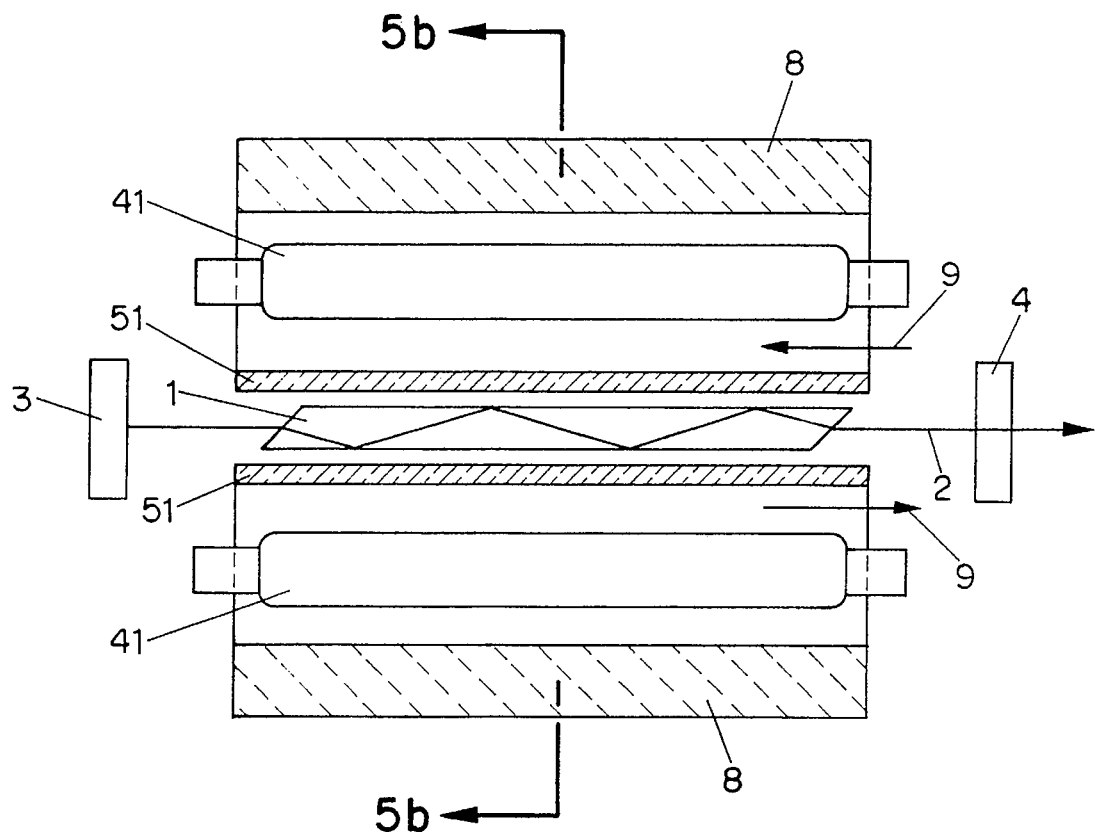
FIG. 5(a) is a longitudinal cross section of still another preferred embodiment of a slab YAG laser device according to the present invention.
Figure 5B:
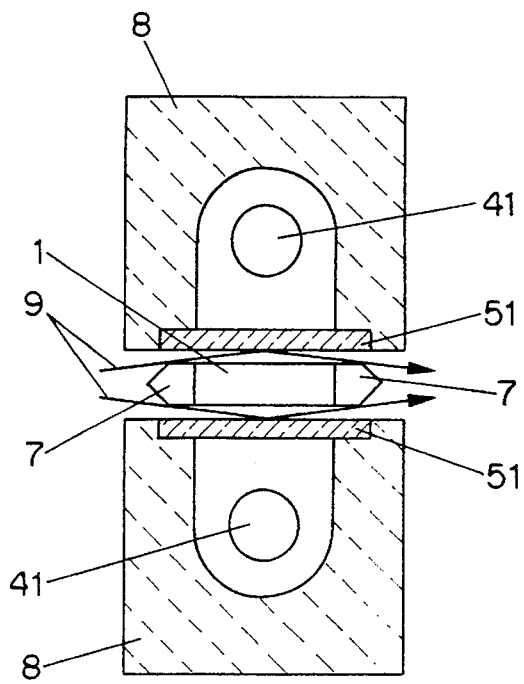
FIG. 5(b) is a lateral cross section of the slab YAG laser device shown in FIG. 5(a) taken along line 5b—5b.

Shown in FIGS. 5(*a*) and 5(*b*) is another embodiment of the solid-state laser device according to the present invention. In this embodiment, wavelength conversion filters 51 are used instead of the borosilicate glass filters. The wavelength conversion filters 51 convert light from the flash lamps 41 into light of wavelength $\lambda$ around $\lambda=810$ nm, which is most suitable for the excitation of YAG crystal 1. Material for the filters 51 may be any one of $Y_3Al_5O_{12}$ (YAG), $Y_3Ga_5O_{15}$ (YGG), $Y_3Sc_2Ga_3O_{12}$ (YSGG), $Gd_3Ga_5O_{12}$ (GGG), $Gd_3Sc_2Ga_3O_{12}$ (GSGG), $La_3Lu_2Ga_3O_{12}$ (LLGG), $KYnF_3$ (KYF), $BeAl_2O_4$ (alexandrite), $LiSrAlF_6$ (LiSAF), and $LiCaAlF_6$ (LiCAF), all of which are doped with $Cr^{3+}$. The filters 51 may also be glass doped with $Cr^{3+}$, or $Al_2O_3$ (sapphire) doped with $Ti^{+3}$. In order to prevent these materials from deteriorating under ultraviolet rays, however, the excitation flash lamps 41 are doped with cerium (Ce).

The above-listed materials used as the wavelength conversion filters 51 have been previously used as solid-state laser media. However, because the emission spectra of these materials have their peaks at the wavelength $\lambda$ in the vicinity of $\lambda=810$ nm, which is suitable for the excitation of $Nd^{3+}$ as described in, for example, Japanese unexamined patent publication (Kokai) No. H2-123776. Accordingly, these materials are well suited for converting the wavelength of excitation light.

When the above-listed materials for the wavelength conversion filters 51 are used as a laser medium, they must have high optical uniformity throughout the crystal. This poses a significant problem because of the difficulty of growing a large crystal that satisfies such a requirement. However, for the purpose of functioning as a filter for converting the wavelength of excitation light, such a high optical uniformity throughout the crystal is not required, and a large crystal for this purpose can be easily produced. The function of serving as a wavelength conversion filter will be sufficiently accomplished even by a crystal whose thermal conductivity is so small as to cause a strong thermal lens effect, which would disqualify the crystal to function as a laser crystal.

For example, a crystal such as $Al_2O_3$ doped with $Ti^{3+}$ (Ti:sapphire) must be strongly excited to be used as a laser crystal because the duration of fluorescence is short. However, the short duration of fluorescence means the high transition probability for the high fluorescent emission efficiency. This is rather preferable for a wavelength conversion filter. Such wavelength conversion filters absorb excitation light of wavelength $\lambda=400$ to $650$ nm and emit light of wavelength $\lambda$ around $\lambda=810$ nm which is suitable for the excitation of $Nd^{3+}$. Since the light of wavelength $\lambda$ around $\lambda=810$ nm is of course transmitted through the filter without absorption, the total efficiency is improved by an amount corresponding to the portion of excitation light which has been subjected to wavelength conversion.

In the embodiment shown in FIGS. 5(*a*) and 5(*b*), amongst the beams of light emitted by the flash lamps 41, beams of wavelength $\lambda$ around $\lambda=810$ nm are transmitted through the wavelength conversion filters 51 and are directly incident on the YAG crystal 1. Contrastingly, most of the beams of wavelength λ=400 to 650 nm are absorbed by the wavelength conversion filters 51 and converted to beams of wavelength λ around λ=810 nm to be absorbed by the YAG crystal 1. Accordingly, most of the excitation light emitted by the flash lamps 41 is converted to that of wavelength λ at λ=810 nm, which is most suitable for the excitation of the YAG crystal 1, and this allows extremely efficient laser oscillation. In addition, most of optical energy which does not contribute to laser oscillation is converted into thermal energy in the wavelength conversion filters 51. As a result, the thermal load of the YAG crystal and the negative effects attributable to temperature rise on the crystal, such as a thermal lens effect, are reduced, thereby improving the quality of the oscillated laser beam.

Figure 6A:
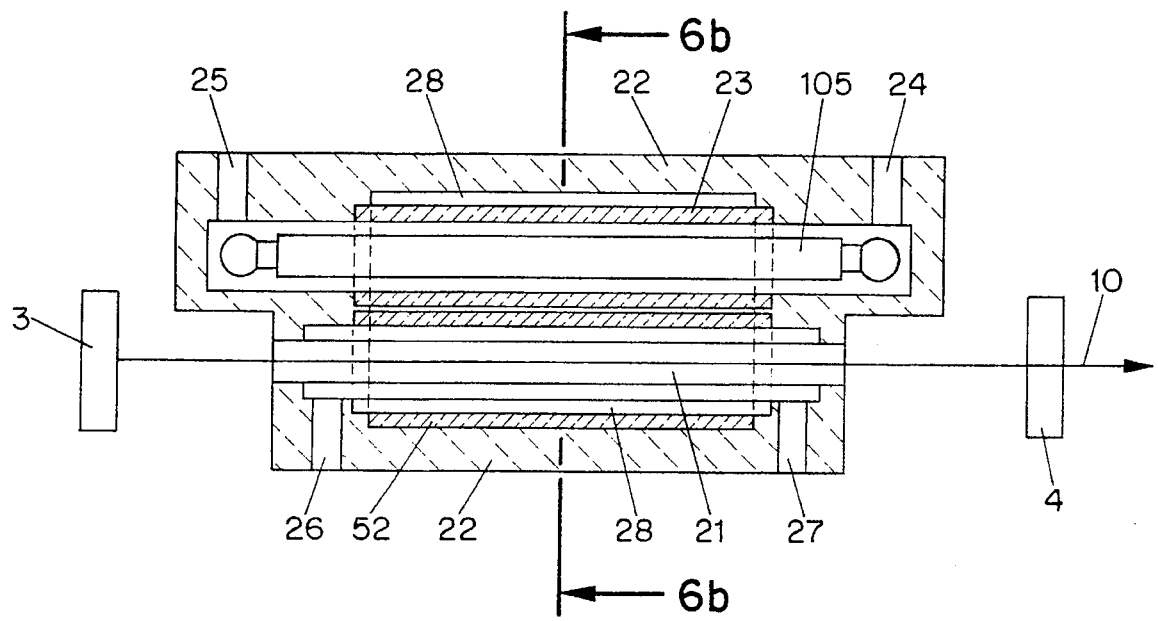
FIG. 6(a) is a longitudinal cross section of a preferred embodiment of a rod-shaped YAG laser device according to the present invention.
Figure 6B:
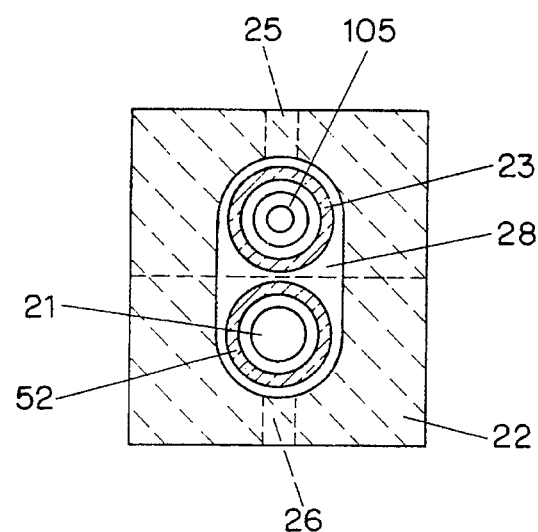
FIG. 6(b) is a lateral cross section of the rod-shaped YAG laser device shown in FIG. 6(a) taken along line 6b—6b.

Shown in FIGS. 6(a) and 6(b) is an embodiment of a rod-type YAG laser device according to the present invention. In this embodiment, the laser medium is a rod-shaped Nd:YAG crystal 21, and a reflector 22 made of ceramic is used. The reflector 22 surrounds a tubular wavelength conversion filter 52, which in turn surrounds the rod-shaped crystal 21, and a flow tube 23 made of borosilicate glass. The flow tube 23, which in turn surrounds a flash lamp 105, serves as a channel for cooling water which flows from an inlet 24 to an outlet 25 for cooling the flash lamp 105. A space between the YAG crystal rod 21 and the filter 52 serves as a channel for cooling water which flows from an inlet 26 to an outlet 27 for cooling the YAG crystal rod 21. A space 28 defined by the filter 52, flow tube 23, and the reflector 22 is also filled with cooling water. The material for the filter 52 may be any of Cr:YAG, Cr:YGG, Cr:YSGS, Cr:GGG, Cr:GSGG, Cr:LLGG, Cr:KYF, Cr:LiSAF, Cr:LiCAF, Cr-doped alexandrite, Cr-doped glass, and Ti-doped sapphire.

In the preferred embodiments, the foamed glass is a quartz glass, $SiO_2$, containing small bubbles of a few hundred microns in size, with specific gravity of one-tenth to one-half of ordinary quartz glass. Since this material has low thermal conductivity and is easily machinable, it can be used for thermal insulation, for example. The thermal conductivity of foamed quartz glass is as low as one tenth of the thermal conductivity of ordinary quartz glass. Although ordinary quartz glass has high transmittance at wavelengths down to the ultraviolet region, foamed quartz glass has high reflectance due to the many internal solid-to-gas interfaces. This may be likened to the high reflectance of snow which is an aggregate of fine ice particles.

I claim:

1. A solid-state laser device comprising:
   a solid-state laser medium having a pair of opposing surfaces, a first longitudinal end, and a second longitudinal end;
   a totally reflecting mirror disposed at said first longitudinal end of the laser medium and a partially transparent mirror disposed at said second longitudinal end of the laser medium;
   a light source for exciting said solid-state laser medium;
   means for introducing light produced by said light source into said solid-state laser medium, said light introducing means comprising a glass reflector having a plurality of bubbles therein; and
   means, coupled to said pair of opposing surfaces of said laser medium, for insulating said pair of opposing surfaces, said insulation means comprising a glass having a plurality of bubbles therein.

2. The solid-state laser device of claim 1, wherein the solid-state laser medium consists essentially of YAG crystal.

3. The solid-state laser device of claim 1, wherein the glass reflector consists essentially of quartz glass having a plurality of bubbles therein.

4. The solid-state laser device of claim 1, wherein the glass insulation means consists essentially of quartz glass having a plurality of bubbles therein.

5. The solid-stage laser device of claim 1, further comprising a wavelength filter means disposed between the light source and the laser medium, said wavelength filter means filtering ultraviolet rays.

6. The solid-state laser device of claim 5, wherein the wavelength filter means consists essentially of borosilicate glass.

7. The solid-state laser device of claim 1, wherein the light source comprises a krypton flash lamp.

8. The solid-state laser device of claim 3, wherein said glass reflector has an outer surface, said device further comprising a packed powder insulation layer coupled to said outer surface of said glass reflector, said powder being selected from the group consisting essentially of magnesium oxide and barium sulfate.

* * * * *